A. E. MILLER AND C. E. ANABLE.
SAFETY CRANK FOR AUTOMOBILES.
APPLICATION FILED SEPT. 17, 1918.
1,312,410.
Patented Aug. 5, 1919.
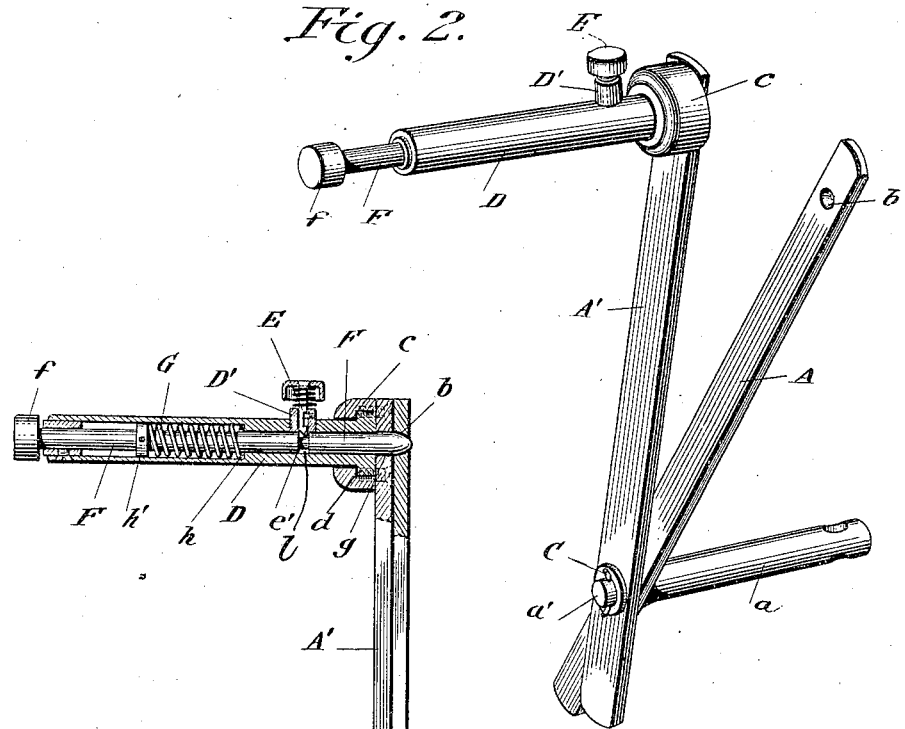
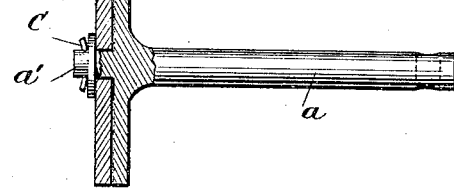
Inventors.
Arthur E. Miller.
Clarence E. Anable.
By T. Walter Fowler
atty.

UNITED STATES PATENT OFFICE.

ARTHUR E. MILLER AND CLARENCE E. ANABLE, OF SACRAMENTO, CALIFORNIA.

SAFETY-CRANK FOR AUTOMOBILES.

1,312,410.   Specification of Letters Patent.   Patented Aug. 5, 1919.

Application filed September 17, 1918. Serial No. 254,455.

*To all whom it may concern:*

Be it known that we, ARTHUR E. MILLER and CLARENCE E. ANABLE, citizens of the United States, residing at Sacramento, in the county of Sacramento and State of California, have invented certain new and useful Improvements in Safety - Cranks for Automobiles, of which the following is a specification.
Our invention relates to certain new and useful improvements in automobile safety cranks or handles; that is, handles or cranks which are employed with automobiles for starting or cranking the engine and wherein provision is made for reducing or eliminating entirely the discomfort and danger to the operator arising from the "back-fire" of the engine.

A leading object of the present invention is to provide a safety crank or handle which will compensate for the shock arising from back-firing of the engine and which will automatically relieve the operator from the tendency of the crank to suddenly rotate backwardly and thereby injure the operator.

With the above and other objects in view, our invention consists of the parts and the constructions, arrangements and combinations of parts which we will hereinafter describe and claim.

In the accompanying drawings forming part of this specification and in which similar reference characters indicate like parts in the several views;
Fig. 1 is a sectional view of a safety-crank or handle embodying our invention.

Fig. 2 is a perspective view showing the parts of the divided crank or handle separated, as when the engine has back-fired.
In carrying out our invention, we construct the crank or handle of two main members, A—A'; in other words, the crank or handle is of a two-part character in that the crank portion proper is divided longitudinally, but these parts or members are so fashioned and associated with other and coacting features that the said parts may be united or joined to form a substantially rigid crank for use during the cranking of the engine, one of said members being adapted for immediate release from the other part, *i. e.* the part under the control of the operator, in the event of the back firing of the engine, and may be rotated about the axis of the crank independently of the other part, whereby the back motion transmitted to the crank from the engine will not be communicated to the portion of the crank held in the hand of the operator.

The member, A, of the divided crank or handle, is provided with the shaft, *a*, by which connection is made with the crankshaft of the engine, for starting the latter, said member, A, carrying in line with the shaft a projection or pin, *a'*, and the outer end of this member being formed with a tapering or other socket, *b*.

The companion member A', of the divided crank or handle is pierced with an opening to receive the pin, *a'*, the two parts of the crank or handle being connected to each other by a pin, C, or other appropriate fastening. To the outer end of the member, A', of the divided crank or handle is secured a fixed housing or bearing, *c*, in which is swiveled or rotatably mounted the flanged-end, *d*, of a sleeve or tubular hand-piece, D, which forms the grip for the operator during the cranking function of the engine, said sleeve or handle having a projecting nipple, D', in which is mounted a spring-dog, E, the inner end of which may be tapered or beveled, if desired, as indicated at *e'*.

Within the tubular sleeve or handle, D, is mounted a longitudinally-slidable spring-pressed pin, F, the outer end of which is provided with a finger-piece, *f*, while the inner end is designed to be projected through an opening, *g*, in the outer end of the member, A', of the divided crank or handle, the extremity of said pin or bolt being, if desired, tapered and fashioned to be projected into and to occupy the socket formed in the outer end of the member, A, of the crank or handle, when the two parts of said crank are in line and the openings, *b*, and *g* are in register.

Surrounding the pin or bolt is a spring, G, one end of which seats against a shoulder or flange, *h*, on the inner surface of the sleeve or handle, D, while the other end seats against a collar, *h'*, formed on the pin or bolt, said spring exerting its power expansively to normally hold the pin or bolt in its outer or projected position and with the inner end disconnected or withdrawn from engagement in the openings, *b* and *g*, in the members, A—A', respectively, of the divided crank or handle, and with the spring-pressed dog normally out of engagement with a groove, *l*, or like part with which the sliding pin or bolt is provided in an intermediate portion.

In operating the crank for the purpose of cranking the engine and assuming that the crank has been mounted in the customary manner and is hanging in front of the radiator of the automobile, the operator will grasp the loose or swiveled sleeve or handle and at the same time will press the pin or bolt, F, inward, which will force the opposite end of the bolt or pin through and into locking engagement with the alined holes, *b* and *g*, in the two parts of the divided crank, thereby locking these parts together and making of them a rigid crank for communicating motion to the engine shaft. At the same time the thumb of the operator will be employed to press down upon the spring-actuated dog, E, the inner end of which is thus moved inwardly to intercept the groove or notch, *l*, in the pin or bolt, and thereby hold the pin in its projected position. With the parts in the position stated, the crank or handle may be rotated in the usual manner for starting the engine, but it will be understood that in the event of the engine "backfiring," the sudden shock due to the same will be transmitted momentarily to the handle and this will result in the operator's thumb being jolted from its holding contact with the spring-pressed dog, thereby releasing this dog and allowing the pin or bolt, F, to be instantly projected outwardly, out of connection with the driving member, A, of the divided crank or handle and disconnecting the latter from the part, A', of the handle, and which part carries the tubular sleeve, which the operator is grasping. The "back-firing" of the engine will thus be communicated to the part, A, of the handle, while the part, A', which is grasped by the operator will remain stationary relatively to the part, A, which is directly connected to the engine shaft. Thus all danger of a broken arm or other injury to the operator is avoided and a safety appliance for the cranking of automobiles and the like is provided.

Having thus described our invention what we claim as new and desire to secure by Letters Patent is:—

1. A safety crank or handle having companion members one of which is adapted to connect with an engine shaft and the other is designed to be grasped by the hand, shiftable means for connecting said members whereby they may be turned in unison to rotate said shaft, and a spring-actuated detent controlled by the operator's finger for holding the connecting means in a shifted position, said detent being automatically released by sudden vibration of the engine communicated through the crank to the operator's hand.

2. A safety crank or handle comprising a pair of co-acting members one of said members adapted to connect with an engine shaft, and the other member adapted to be grasped by the hand, said members being pivotally-mounted at one end one relatively to the other and having the opposite or free ends provided with openings adapted to register, and manually operated locking devices carried by the hand-engaged member and engageable with the other member when said openings are in register.

3. A safety crank or handle comprising a pair of members lying side by side and pivotally connected at one end, said members having their opposite or free ends provided with openings adapted to register, a sleeve projecting from one of said members and loosely-mounted relatively thereto, and a longitudinally slidable pin carried by said sleeve and adapted to be endwise thrust into locking engagement with said members when the openings therein are in register, whereby the free ends of the members are locked one to the other.

4. A safety crank for automobiles, said crank having companion members pivotally connected to each other at one end and having the opposite ends normally disconnected and provided with registering openings, and a hand-piece and a sliding pin mounted therein carried by the free end of one of said members, said pin adapted to be thrust endwise into locking engagement with the members when said openings are in register.

5. A safety crank for automobiles, said crank having companion members pivotally connected to each other at one end and having the opposite ends normally disconnected and provided with registering openings, and a hand-piece and a sliding pin mounted therein carried by the free end of one of said members, said pin adapted to be thrust endwise into locking engagement with the members when said openings are in register, and a detent for holding the pin in its locking position.

6. A safety crank for automobiles, said crank having companion members pivotally connected to each other at one end and having the opposite ends normally disconnected and provided with registering openings, a hand-piece and a sliding pin mounted therein by the free end of one of said members, said pin adapted to be thrust endwise into locking engagement with the members when said openings are in register, and a manually-controlled detent on said hand-piece adapted to engage said pin to hold the latter in locked engagement with said members, said detent being automatically actuated to release the locking pin when back motion is imparted to one of said members.

7. A safety crank for automobiles, said crank comprising a pair of members lying side by side and pivotally connected one to the other at one end, the opposite ends of said members being normally disconnected and provided with openings adapted to register; a sleeve projecting laterally from the free end of one of said members and turnable relatively thereto; a spring-pressed pin in said sleeve adapted to be endwise thrust into said openings when the latter are in register whereby said members are united as a unit; and a manually-controlled spring-actuated dog to engage the pin and hold it in a locking position said dog automatically releasing the pin when sudden back-motion is imparted to said members, whereby said members are permitted to rotate one relatively to the other.

In testimony whereof we affix our signatures.

ARTHUR E. MILLER.
CLARENCE E. ANABLE.

Copies of this patent may be obtained for five cents each, by addressing the "Commissioner of Patents, Washington, D. C."